US010627003B2

(12) United States Patent
Dale et al.

(10) Patent No.: US 10,627,003 B2
(45) Date of Patent: Apr. 21, 2020

(54) VALVES AND CONTROL SYSTEMS FOR PRESSURE RELIEF

(71) Applicants: Clayton Dale, Townville, PA (US);
Josh Lewallen, Robinson, TX (US)

(72) Inventors: Clayton Dale, Townville, PA (US);
Josh Lewallen, Robinson, TX (US)

(73) Assignee: The E3 Company LLC

(*) Notice: Subject to any disclaimer, the term of this patent is extended or adjusted under 35 U.S.C. 154(b) by 104 days.

(21) Appl. No.: 15/917,161

(22) Filed: Mar. 9, 2018

(65) Prior Publication Data

US 2018/0259080 A1 Sep. 13, 2018

Related U.S. Application Data

(60) Provisional application No. 62/469,326, filed on Mar. 9, 2017.

(51) Int. Cl.
| | |
|---|---|
| *F16K 31/02* | (2006.01) |
| *F16K 17/04* | (2006.01) |
| *E21B 41/00* | (2006.01) |
| *F16K 37/00* | (2006.01) |
| *E21B 34/16* | (2006.01) |
| *F16K 17/168* | (2006.01) |
| *E21B 43/26* | (2006.01) |
| *F16K 17/10* | (2006.01) |

(52) U.S. Cl.
CPC ............ *F16K 17/048* (2013.01); *E21B 34/16* (2013.01); *E21B 41/0021* (2013.01); *E21B 43/26* (2013.01); *F16K 17/10* (2013.01); *F16K 17/168* (2013.01); *F16K 37/005* (2013.01)

(58) Field of Classification Search
CPC ...... F16K 17/048; F16K 17/168; F16K 17/10; F16K 17/105; F16K 17/285; F16K 17/383; F16K 17/32; F16K 37/005; E21B 34/16; E21B 41/0021; E21B 43/26
USPC ...... 137/487.5, 488, 565.14, 624.27, 596.16, 137/879, 557, 485; 251/315.02; 73/715, 73/729.1, 729.2, 707, 716, 736, 747, 756
See application file for complete search history.

(56) References Cited

U.S. PATENT DOCUMENTS

| | | | | |
|---|---|---|---|---|
| 2,871,876 A | * | 2/1959 | Edmund | ................. F16K 17/32 137/464 |
| 3,150,681 A | * | 9/1964 | Hansen | ................... F16K 5/202 137/454.2 |

(Continued)

*Primary Examiner* — Minh Q Le
(74) *Attorney, Agent, or Firm* — Cohen & Grigsby, P.C.

(57) ABSTRACT

A pressure relief system configured to automatically monitor and correct overpressure events in hydraulic fracturing or well stimulation activities is disclosed. The system generally includes at least two valve assemblies each having a valve and a valve actuation system, at least one pressure sensor, and an electro-mechanical control package. These components are configured such that the electro-mechanical controls automate the open and closed positions of the valve(s) via operation of the actuator(s) based on information from the pressure sensor. This architecture allows the system to monitor and interpret pressures within the conduit and operate the valve position based on user defined set-points. The valves may be positioned to redundantly monitor the same fluid conduit, or separate fluid conduits, and the system may be configured to enable independent valve positions based on independent user defined set-points or user inputted control signals.

18 Claims, 13 Drawing Sheets

(56) References Cited

U.S. PATENT DOCUMENTS

| | | | | |
|---|---|---|---|---|
| 3,380,708 A * | 4/1968 | Scaramucci | F16K 5/0642 | 251/172 |
| 3,397,712 A * | 8/1968 | Boroson | F16K 17/168 | 137/68.27 |
| 3,441,045 A * | 4/1969 | Malone | B01F 5/0495 | 137/114 |
| 3,460,802 A * | 8/1969 | Colby | F16K 5/0678 | 251/172 |
| 3,650,506 A * | 3/1972 | Bruton | F16K 17/32 | 251/26 |
| 3,712,585 A * | 1/1973 | Grenier | F16K 5/0642 | 251/174 |
| 4,233,926 A * | 11/1980 | Rogers | F16K 5/0605 | 116/208 |
| 5,212,989 A * | 5/1993 | Kodama | G01L 19/0038 | 73/706 |
| 5,676,348 A * | 10/1997 | Ungchusri | F16K 5/0471 | 251/309 |
| 5,692,537 A * | 12/1997 | Arian | G05D 7/0126 | 137/486 |
| 6,516,670 B2 * | 2/2003 | Hegner | G01L 9/0075 | 73/715 |
| 6,543,468 B2 * | 4/2003 | Hess | F16K 5/0605 | 137/15.11 |
| 6,651,686 B2 * | 11/2003 | Scantlin | G05D 16/18 | 137/461 |
| 6,789,566 B1 * | 9/2004 | Welcker | A62C 2/04 | 137/39 |
| 6,843,265 B2 * | 1/2005 | Taylor | F16K 17/406 | 137/488 |
| 7,044,156 B2 * | 5/2006 | Webster | F16K 17/02 | 137/488 |
| 2001/0015105 A1 * | 8/2001 | Gerst | G01L 9/0075 | 73/715 |
| 2003/0200812 A1 * | 10/2003 | Kuhn | A61M 1/3639 | 73/715 |
| 2013/0008519 A1 * | 1/2013 | Crawford | G05D 16/2093 | 137/14 |
| 2014/0048255 A1 * | 2/2014 | Baca | E21B 33/068 | 166/250.1 |
| 2016/0238138 A1 * | 8/2016 | Rodriguez | F16K 17/0406 | |
| 2017/0212535 A1 * | 7/2017 | Shelman | E21B 43/26 | |
| 2017/0285668 A1 * | 10/2017 | Moseley | E21B 43/26 | |

* cited by examiner

VALVES AND CONTROL SYSTEMS FOR PRESSURE RELIEF

RELATED APPLICATIONS

This application claims the benefit under 35 U.S.C. § 119(e) of prior U.S. Provisional Patent Application Ser. No. 62/469,326, filed on Mar. 9, 2017, the entire content of which is hereby incorporated by reference.

TECHNICAL FIELD

The present invention relates generally to systems and methods for pressure relief in fluid pipelines, and more specifically to valves and control systems for automatic monitoring and relief of overpressure conditions in high pressure conduits.

BACKGROUND

Fluid lines under high pressure (e.g., pressure vessels and piping systems) are often designed with pressure relief valves to protect the line from dangerous overpressure conditions. These pressure relief valves are generally self-actuated devices set to open when the pressure in the fluid line exceeds a specified level (set-point), allowing fluid to exit the system and thus relieve the overpressure condition. One such example, U.S. Pat. No. 9,677,391, utilizes a valve body having a replaceable disk that ruptures when an overpressure event occurs, allowing fluid to escape to the atmosphere. Another example, U.S. Pat. No. 9,903,493, uses a valve that is forced into the closed position by a buttressing rod. In the event of an overpressure condition in the fluid line, the rod buckles or collapses, opening the valve and allowing fluid to flow through the valve. In both examples, the relief valve is useable only one time, requiring replacement of parts before returning to service, and does not provide a means to quickly reclose the valve when the overpressure condition is resolved.

Certain other examples, such as U.S. Pat. No. 8,281,804, do provide means to reclose the valve when the pressure drops below the set-point, but each suffer from other design shortcomings. For example, each use relief valves that include a ninety (90) degree turn in the fluid flow path directly in communication with the sealing mechanism, and expose one or more sealing faces to abrasive fluid flow. These ninety degree valves typically rely on a mechanical spring arrangement or similarly limited capability with regard to the ease of set-point adjustments. As such, even though they may reclose, they are often unstable in operation, with rapid opening and closing of the closure element as the pressure in the line fluctuates near the pressure set-point (i.e., when the pressure rises to slightly above the set-point and then drops as a result of fluid flowing from the system through the pressure relief valve). Such unstable operation can cause physical damage to components of the pressure relief valve.

Other solutions for pressure relief attempt to electronically control the set-point for a single valve by applying control to a similarly designed ninety degree valve. See for example U.S. Pat. Nos. 3,776,249, 6,283,138, and 9,109,717. However, while they improve upon the ease of user pressure adjustments and set-points, they fail to address the very elementary problem of abrasive slurry erosion on the sealing mechanisms.

Still other solutions seek to utilize industry recognized linear actuated valves that provide seals on the downstream sides of the valves, coupled to single set-point electronic control, but these solutions still fail to remove the sealing face from abrasive fluid flow. Moreover, in industries where the pressure in the conduits is extremely high, such as in the hydraulic fracturing industry, these solutions may also fail to meet industry needs. That is, the valve and actuation means were never intended to be applied to relief valve service.

It should also be noted that the aforementioned electronic control systems have also consistently failed to meet the demands of the dynamic nature of pressurized fluid systems used in the hydraulic fracturing industry, and generally only attempt to monitor pressures in a single fluid conduit. Moreover, these electronic controls do not allow the user to fully integrate the valve controls into their previously established data interpretation methods.

It would be desirable to have a system that can protect single or dual pressurized fluid conduit(s), wherein the conduit(s) can be monitored and relieved of potentially catastrophic overpressures in an independent manner. It would also be desirable to have a system that utilizes valves which provide a linear flow path, and which do not expose sealing surfaces to abrasive fluid flow. Furthermore, it would be desirable to have a system that, by virtue of having two valves applied, may act in an independent manner of redundancy when connected to a single fluid conduit. Still further, it would be desirable to have a system that may be coupled to a single conduit such that a first valve is primarily controlled and a second valve may act as a spare "in the wait" to allow efficient operational use. Still further yet, it would be desirable to have a control system configured to allow a user to define both valve settings independently and integrate valve control into their in-use data management systems.

Therefore, there currently exists a need in the industry for a system that provides effective overpressure relief in a pressurized conduit in a manner that incorporates two independently controlled valves, and which uses components, e.g., valves, sensors, etc., that are isolated or protected from the abrasive fluid flow in the pressurized conduit(s).

SUMMARY

Accordingly, the presently disclosed invention overcomes many of the shortcomings of the prior art by providing systems, devices and methods which provide overpressure protection for fluid lines, such as those used in the hydraulic fracturing industry or in a wellbore completion activities.

The present invention is related to a system for overpressure control, wherein the system generally comprises at least two valve assemblies, at least one pressure sensor, and a controller configured to receive signals from the pressure sensor indicating a fluid pressure in a fluid conduit and communicate with the valve assembly to change a position of a valve housed therein, such that when the fluid pressure in the fluid conduit exceeds a user-defined high pressure limit, the valve is opened, and when the fluid pressure in the fluid conduit falls below a user-defined low pressure limit, the valve is closed.

According to certain aspects of the present invention, each valve assembly may include a valve actuation system having a source of actuation fluid and optionally a pump, and a valve housing having a longitudinal bore therethrough, the valve housing comprising an upstream connection, a downstream connection, and a valve positioned therebetween. The valve may comprise a ball valve, wherein the ball valve may include a valve body having a throughbore, wherein an open position of the valve body provides flow-through alignment of the throughbore with the upstream and downstream connections of the valve housing, and a closed position of the valve body provides an out of flow-through alignment of the throughbore with the upstream and downstream connections of the valve housing; an upstream seal comprising an outward facing surface positioned perpendicular to the longitudinal bore of the valve housing, wherein a fluid pressure on the outward facing surface forces the upstream seal against a sealing face of the valve body, and a downstream seal. The sealing face of the valve body may be a polished metal.

According to certain aspects of the present invention, the at least one pressure sensor may include at least one pressure transducer, and a pressure chamber having a diaphragm surrounding a pressure fluid within the pressure chamber, wherein the pressure fluid is fluidly connected to the at least one pressure transducer to transfer an external fluid pressure on the diaphragm to the pressure transducer(s), and wherein the diaphragm comprises a flexible and deformable structure. The pressure chamber may be attachable on the fluid conduit such that the fluid pressure in the conduit comprises the external fluid pressure on the diaphragm.

According to certain aspects of the present invention, various components of the system may be contained in a housing or frame, such as the at least two valve assemblies, the at least one pressure transducer, and the controller. The housing or frame may further comprise one or more batteries configured to provide power to the at least the valve actuator, the at least one pressure transducer, and the controller. The housing or frame may be a standalone component, or may be included as part of a tank which may collect fluids released from the fluid conduit when the valve is opened. Moreover, the tank may be a standalone component, such as a tank that may be dropped at a location (e.g., frac tank), or one that is included as part of a vehicle (e.g., tractor trailer).

According to certain aspects of the present invention, the valve actuation system may comprise a biasing member in a valve actuation chamber which biases the valve to an open position. Supply of the valve actuation fluid into the valve actuation chamber may then provide counterforce on the biasing member to move the valve to a closed position. The biasing member may be a spring, and the valve actuation fluid may be a gas or a hydraulic fluids. Moreover, the valve actuation system may comprise a scotch yoke.

According to certain aspects of the present invention, the valve actuation system may be configured to open the valve at a rate sufficient to reduce the fluid pressure in the main conduit by at least 50% within 1 second, or 70% within 1 second, or even 90% within 1 second. Moreover, the controller may be configured to hold the valve open for a set time period when the fluid pressure in the main conduit exceeds the user-defined high pressure limit, and if, after the set time period, the fluid pressure in the main conduit is at or below the user-defined low pressure limit, the controller is configured to close the valve According to certain aspects of the present invention, at least two pressure transducers are included in the pressure sensor, and the signal from the pressure sensor received by the controller may comprise individual signals from the at least two pressure transducers, and wherein the individual signals are received at a rate of at least 50 signals/second, such as 75 signals/second, or even 100 signals/second.

The present invention is also directed to methods for overpressure control in a fluid line, wherein the method generally comprises providing a system according to any of the aspects described above; attaching a first end of a first bypass conduit to the upstream connection of the valve housing of a first valve assembly; attaching a first end of a second bypass conduit to the downstream connection of the valve housing of the first valve assembly; attaching the pressure chamber of a first pressure sensor on a main conduit such that an outward facing side of the diaphragm is in contact with a fluid in the main conduit; and setting a high pressure limit and a low pressure limit for the first valve assembly using a user interface on the control system. The control system is configured to receive a signal from the first pressure sensor indicating a fluid pressure in the main conduit, and communicate with the valve actuation system of the first valve assembly to change a position of the valve, such that when the fluid pressure in the fluid line exceeds the high pressure limit the valve is opened, and when the fluid pressure in the fluid falls below the low pressure limit the valve is closed.

According to certain aspects of the invention, the method may further comprise attaching a second end of the first bypass conduit to the main conduit; and directing a second end of the second bypass conduit to a fluid containment area. The fluid containment area may be a reservoir, earthen pit, or a tank such as a frac tank.

According to certain aspects of the present invention, the methods may further comprise attaching a first end of a third bypass conduit to the upstream connection of the valve housing of a second valve assembly; attaching a first end of a forth bypass conduit to the downstream connection of the valve housing of the second valve assembly; and setting a high pressure limit and a low pressure limit for the second valve assembly using the user interface on the control system. The control system is configured to communicate with the valve actuation system of the second valve assembly to change a position of the valve.

According to certain aspects of the methods, the first, second, third, and forth bypass conduits are all portions of a single bypass line having a connection to the fluid line. Alternatively, the first and second bypass conduits are portions of a first bypass line having a connection to the fluid line, and the third and fourth bypass conduits are portions of a second bypass line having a connection to a second fluid line. In this latter case, the method may further comprise attaching the pressure chamber of a second pressure sensor on the second fluid line such that an outward facing side of the diaphragm is in contact with a fluid in the second fluid line, wherein the control system is configured to receive a signal from the second pressure sensor indicating a fluid pressure in the second fluid line, and communicate with the valve actuation system of the second valve assembly to change a position of the valve, such that when the fluid pressure in the fluid line exceeds the high pressure limit the valve is opened, and when the fluid pressure in the fluid line falls below the low pressure limit the valve is closed.

The present invention is also directed to methods for controlling pressure in a fluid line. The methods may comprise the steps of: monitoring, using a diaphragm of a pressure chamber and at least one pressure transducer, a pressure in a fluid line; determining, using a controller, if the pressure in the fluid line exceeds a high pressure limit, wherein, responsive to determining the pressure in the fluid line, if the pressure exceeds the high pressure limit, controlling an actuator to move a valve of at least one valve assembly to an open position; maintaining the valve in the open position for a specific amount of time; determining, using a controller, if the pressure in the fluid line is below a low pressure limit; and responsive to determining the pressure in the fluid line, if the pressure is below the low pressure limit, controlling the actuator to move the valve of the at least one valve assembly to a closed position. Controlling the actuator may comprise controlling a motor and/or hydraulic pump to supply or relieve a pressure in an actuation chamber.

BRIEF DESCRIPTION OF DRAWINGS

Aspects, features, benefits and advantages of the embodiments herein will be apparent with regard to the following description, appended claims, and accompanying drawings. In the following figures, like numerals represent like features in the various views. It is to be noted that features and components in these drawings, illustrating the views of embodiments of the present invention, unless stated to be otherwise, are not necessarily drawn to scale. The illustrative embodiments in the following drawings are not meant to be limiting; other embodiments may be utilized and other changes may be made without departing from the spirit or scope of the subject matter presented herein.

DETAILED DESCRIPTION

Figure 1:
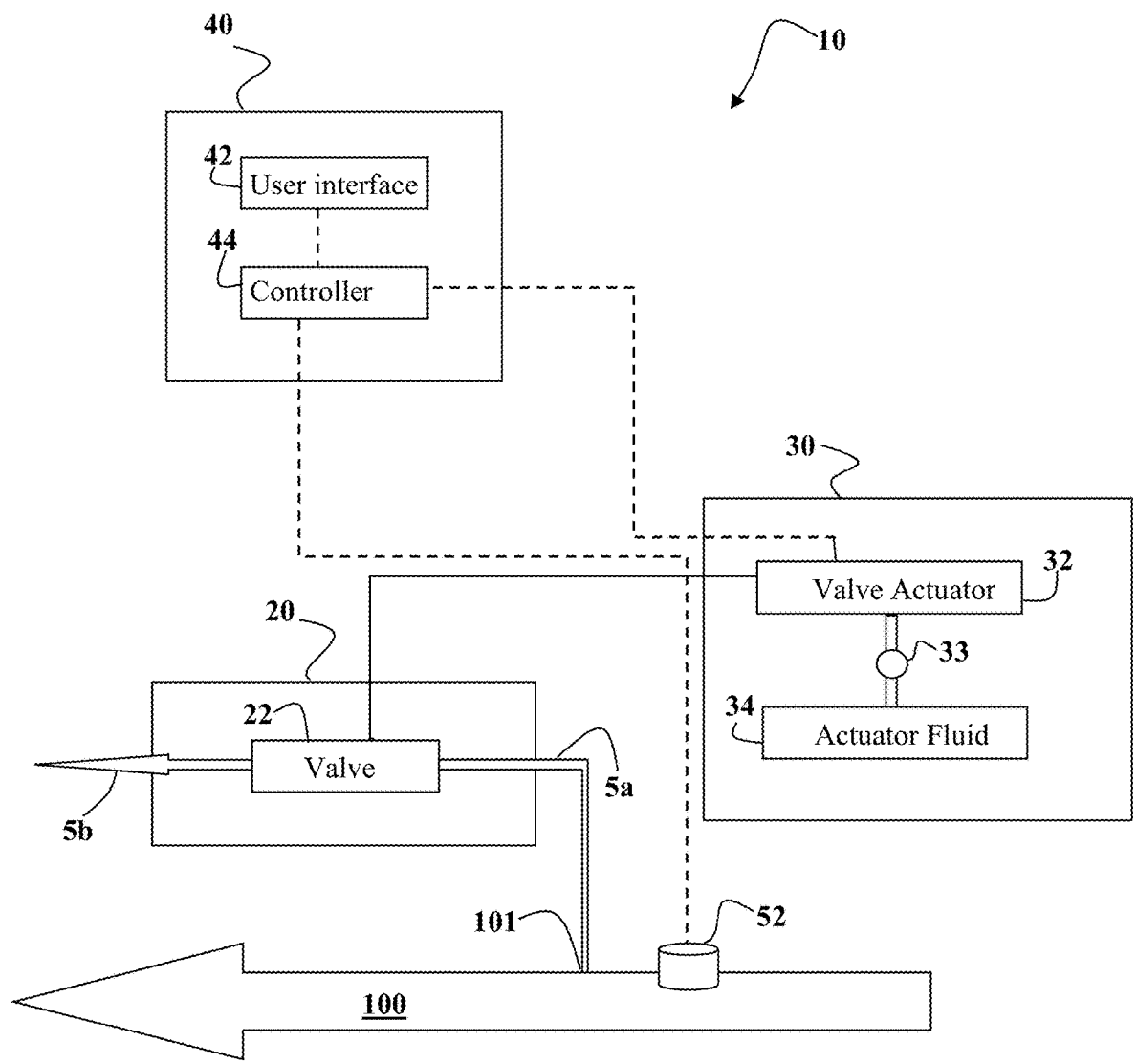
FIG. 1 illustrates a block diagram of a relief valve system in accordance with certain aspects of the presently disclosed invention.

In the following description, the present invention involves systems and methods for control of overpressure conditions in fluid conduits. The above summary and drawings are not intended to describe or show each illustrated embodiment or every possible implementation of the presently disclosed systems and methods. Rather, various aspects of the systems and methods disclosed herein are described and illustrated with reference to one or more exemplary implementations. As used herein, the term "exemplary" means "serving as an example, instance, or illustration," and should not necessarily be construed as preferred or advantageous over other variations of the devices, systems, or methods disclosed herein. "Optional" or "optionally" means that the subsequently described component, event, or circumstance may or may not occur, and that the description includes instances where the event occurs and instances where it does not. In addition, the word "comprising" as used herein means "including, but not limited to".

Various aspects of the systems disclosed herein may be illustrated by describing components that are coupled, attached, and/or joined together. As used herein, the terms "coupled", "attached", and/or "joined" are interchangeably used to indicate either a direct connection between two components or, where appropriate, an indirect connection to one another through intervening or intermediate components. In contrast, when a component is referred to as being "directly coupled", "directly attached", and/or "directly joined" to another component, there are no intervening elements shown in said examples.

Relative terms such as "lower" or "bottom" and "upper" or "top" may be used herein to describe one element's relationship to another element illustrated in the drawings. It will be understood that relative terms are intended to encompass different orientations of aspects of the systems in addition to the orientation depicted in the drawings. By way of example, if aspects of the control system shown in the drawings are turned over, elements described as being on the "bottom" side of the other elements would then be oriented on the "top" side of the other elements as shown in the relevant drawing. The term "bottom" can therefore encompass both an orientation of "bottom" and "top" depending on the particular orientation of the drawing.

It must also be noted that as used herein and in the appended claims, the singular forms "a", "an", and "the" include the plural reference unless the context clearly dictates otherwise. For example, although reference is made herein to "a" valve, "an" actuator, or "the" user interface, one or more of any of these components and/or any other components described herein can be used.

Unless defined otherwise, all technical and scientific terms used herein have the same meanings as commonly understood by one of ordinary skill in the art.

The present invention provides valve assemblies and control systems which afford effective pressure relief for fluid conduits, such as conduits used in the hydraulic fracturing industry or in wellbore completion activities. The valve assembly provides efficient pressure relief through use of at least two individually controllable valves and associated actuators, and thus alleviates the problems associated with prior art single set-point systems. Moreover, the systems include valves which are placed in-line on a conduit, such as a bypass conduit, and thus alleviate the problems associated with 90-degree valves (e.g., valves placed at right angles on high-pressure conduits). The systems also include sensors which are separate or separable from direct contact with the abrasive fluid found in pressurized conduits, and unique valve designs that maintain the sealing face of the valve out of contact with the abrasive fluid flow.

The present invention is novel when compared with other known systems and overpressure solutions in that it provides two independently controlled valves that may monitor the same or two separate fluid conduits, all in a convenient single assembly. The present invention is novel over prior art solutions in the overall system architecture. More specifically, the systems of the present invention provide a specific combination of elements which provide greater performance attributes to the relief valve, improved integration with current wellbore activities, enhanced designs for the valves and actuators, and better electronic control over the process and the data derived therefrom. Furthermore, the hydraulic fracturing industry is not guided by approval agency design criteria with regard to applied valves, therefore the present invention exploits this in a manner that allows for a ball valve placed parallel with the fluid flow path, a unique valve internal geometry, and materials selection that combat the harsh fluid environment during the relief event (i.e., when the valve is open).

Referring now to the drawings, systems and methods according to the presently disclosed invention are shown in FIGS. 1-13. Like reference numbers are used to label similar or shared components in each of the figures. As such, reference to a component depicted in one figure, such as the pressure sensor 52 of FIG. 1, may also include reference to the pressure sensor and included components (52-58) in FIG. 6, and vice versa. As another example, reference to a valve 22 in FIG. 1 may also be reference to a first valve and a second valve (22a and 22b, respectively) in FIG. 4.

With reference to FIG. 1, a system 10 of the present invention includes a valve assembly comprising a valve housing 20 and a valve actuation system 30, and a control system 40 configurable to execute a user defined control process. The valve assembly includes at least two valve housings 20 each containing a valve 22 therein, such as a ball valve, wherein each valve is individually regulatable by a valve actuation system 30. The valve actuation system 30 may include a source of actuation fluid 34, such as a gas or hydraulic fluid, and a drive means configured to open/close the associated ball valve, such as an actuator 32 and a pump 33. According to certain aspects of the present invention, the actuator 32 may be a scotch yoke actuator mechanically coupled to the valve 22, wherein movement of the actuator may be assisted by a pump 33 which forces the actuator fluid 34 into a chamber of the actuator. The control system 40 includes a user interface 42, and a controller 44 including a processor and a memory. The control system 40 may be in communication with a pressure sensing device 52 and the valve actuation system 30 (electrical communications shown as dotted lines in FIG. 1) to provide electronic control over the opening and closing of the valve 22.

During oil and gas operations, fluids are pumped at high pressures through various conduits. For example, during hydraulic fracturing operations, fluids are injected at high pressures through a wellbore into deep underground hydrocarbon formations. In the event that a conduit becomes obstructed, an overpressure condition will develop within the conduits until the pumps are shut down, or until catastrophic failure. As such, pressure relief valves are generally included on these conduits to provide a quick relief of these dangerous overpressure events. The systems and methods of the present invention improve upon the prior art relief valves discussed above by placing the valve in a bypass conduit (5a, 5b) downstream from a connection 101 with a main conduit 100. This allows the valve 22 to be placed 180° with respect to the fluid flow, i.e., the open valve is parallel with the fluid flow, whereas the prior art valves were positioned at 90° to the fluid flow, i.e., the valve assembly was perpendicular to the fluid flow.

Figure 2:
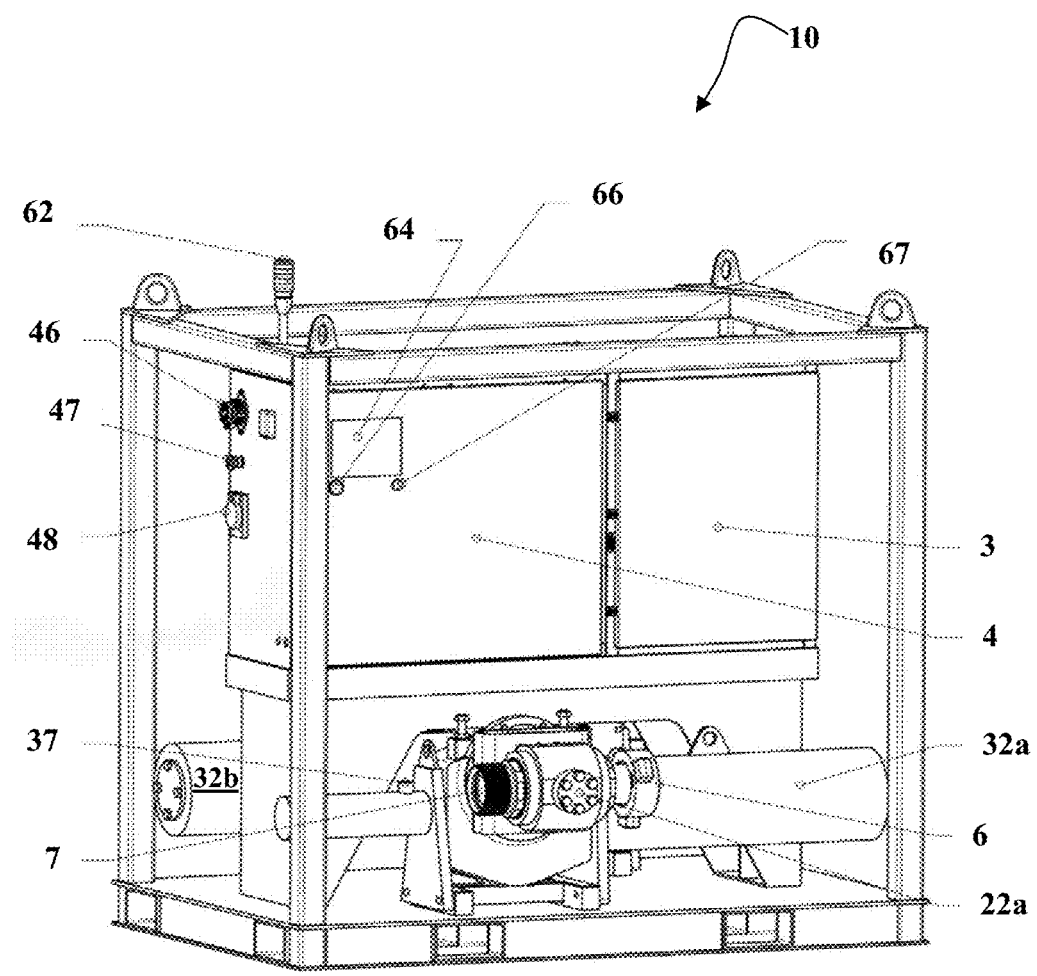
FIG. 2 illustrates a perspective view of a relief valve system in accordance with certain aspects of the presently disclosed invention.

With reference to FIG. 2, an exemplary system 10 of the present invention is shown. The system 10 includes at least two valve assemblies and associated valve actuation systems. Shown in FIG. 2 is a right side perspective view of a frame 102 which contains a hydraulics enclosure 3 containing at least the valve actuation fluid 34 and pump 33. Also shown is an electronic control enclosure 4 which generally contains the power management system, and may further contain portions of the control system. Exemplary power management system components include a power disconnect 46, remote override input 47, and charging input connections 48, which may be included on a face of the electronics enclosure 4. Furthermore, a local screen display 64, voltmeter 66, charging indicator lamps 67, and indicator light stack 62 may also be included on a face of the electronics enclosure 4.

As indicated above, the system 10 includes at least two valve assemblies, each including a valve housing 20 having a valve 22 therein (shown in FIG. 2 is a first valve 22a), wherein the valve housing 20 includes an upstream connection point 6 and a downstream connection point 7. In use, the system 10 may be placed in close proximity to a main conduit 100. One end of a first bypass conduit (see 5a of FIG. 1) may be attached to the main conduit 100 at a connection point 101, and the other end may be attached to the upstream connection point 6 of the valve housing 20. A second bypass conduit (see 5b of FIG. 1) may be attached to the downstream connection point 7 of the valve housing 20, and the other end may be placed in a collection reservoir. Exemplary collection reservoirs include at least an earthen pit, a collection pool, a tank, a portable tank such as on a truck, etc.

The system 10 also includes at least two valve actuation systems 32 to actuate (i.e., open and/or close) the at least two valves 22. As shown in FIG. 2, the valve actuation systems may be positioned in close association with the valve housings 20 and valves 22 within the frame 102 (i.e., valve 22a may be actuated by actuator 32a; valve 22b may be actuated by actuator 32b). Actuation of the valves by the valve actuation system 30 may be triggered by an overpressure event detected by a pressure sensor 50 (see for example FIG. 6).

Figure 3:
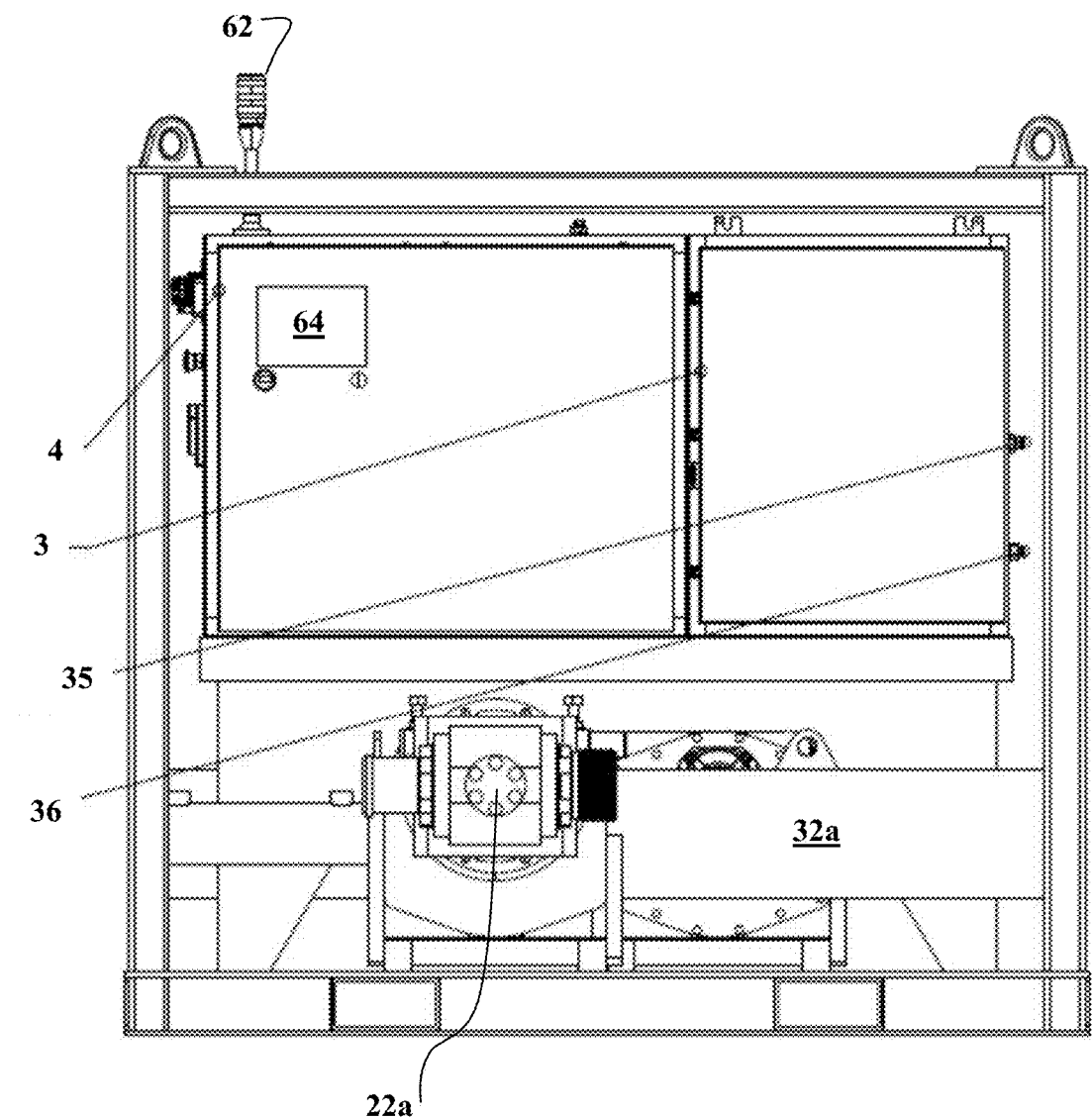
FIG. 3 illustrates a side view of the relief valve system shown in FIG. 2.

As shown in FIG. 3, the system 10 also includes a pressure input port 36 and a hydraulic output port 35 on the hydraulics enclosure 3. The pressure input port 36 may connect to a pressure sensor 52, as discussed in more detail below. As shown in FIG. 1, the pressure sensor 52 may be placed on a high pressure conduit 100 or a bypass conduit 5. The hydraulic output port may provide connection for a fluid line that may pass the hydraulic fluid 34 position in the hydraulics enclosure 4 to the valve actuator 32 via a connection point 37 on thereon (see also FIG. 2). The indicator light stack 62, valve 22, and valve actuator 32 are labeled for reference.

Figure 4:
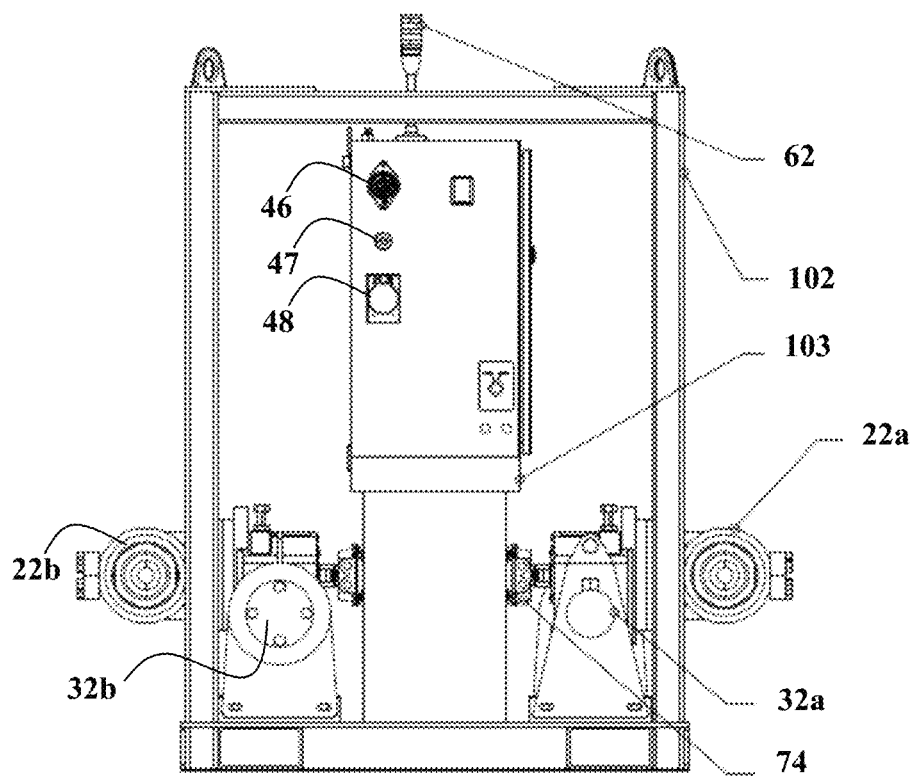
FIG. 4 illustrates a front view of the relief valve system shown in FIG. 2.

A front view of the system 10 is shown in FIG. 4. Both valves (22a and 22b) and valve actuation systems (32a and 32b) are visible, as well as a frame 103 for the control system 40. The frame 103 may provide attachment for the user interface 42 portion of the control system 40. Each of the valve actuation systems 32 may include a valve position sensor 74 configured to determine an open or closed position of the valve 22 and communicate with the control system 40. For reference, the power disconnect 46, remote override input 47, charging input connections 48, and indicator light stack 62 are also shown.

Figure 5:
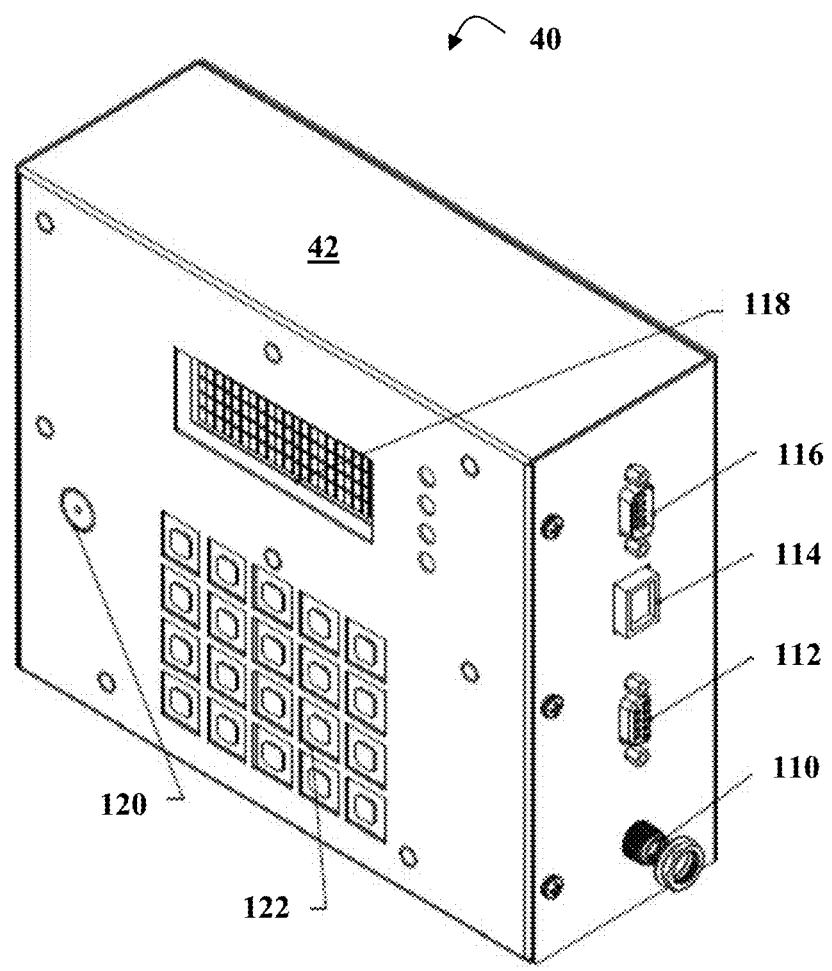
FIG. 5 illustrates a remote user interface assembly in accordance with certain aspects of the presently disclosed invention.

Each of these components may be controlled by control logic included as part of a control system 40 that includes a user interface 42 and a controller 44, as shown in FIG. 5. The user interface 42 may include a display panel 118, and a keyboard interface 122 which provides a means for direct user input to the control system 40. The user interface 42 may also include various ports for data import/export, and power input. For example, the user interface 42 may include a serial port output 116, an Ethernet data output 114, an input for user controller override (open) 112, and a backup power input 110.

The control system 40 may monitor, interpret, control, and provide user interface or information feedback regarding performance of the system and values returned from the various sensors. Moreover, the system 10 as a whole may be configured in various control methodologies. For example, a singularly controlled valve may be controlled through interpretation of a singular pressure sensing point. Alternatively, two separate valves may be controlled independently through interpretation of a singular pressure sensing point. Still further, two separate valves may be controlled independently through interpretation of two separate pressure sensing points. Still further, a singularly controlled valve may be controlled through interpretation of an input signal provided by user. Still further, two separate valves may be controlled independently through interpretation of dedicated input signals provided by the user, such as through the user controlled override (112). Where the operational control signal is supplied by others, the inherent on-board logic may act in a back-up manner to provide redundancy.

As such, the system 10 of the present invention can include a control system 40 to receive signals from the at least one pressure sensor 50, from the valve position sensors 74, and from the user interface 42. According to certain aspects of the present invention, the control system includes a controller 44 which may process these signals. The controller 44 may be a portion of a detachable user interface unit 42, or may be an integrated, attached portion of the control system 40. Alternatively, the control system 40 may include a controller 44 in both of the user interface unit 42 and as a portion of the system integrated in the electronics enclosure 4. It is to be appreciated that aspects of the control system 40 can be implemented by various types of operating environments, computer networks, platforms, frameworks, computer architectures, and/or computing systems.

Implementations of the control system 40 are described within the context of a device configured to perform various steps, methods, and/or functionality in accordance with aspects of the described subject matter. It is to be appreciated that a control system such as a computing device or computer system can be implemented by one or more computing devices. Implementations of the control system 40 can be described in the context of a "device configured to", wherein the term configured may be taken to mean that the device can implement computer-executable instructions that are executed to perform various steps, methods, and/or functionality in accordance with aspects of the described subject matter.

In general, a computer system or computing device can include one or more processors and storage devices (e.g., memory and disk drives) as well as various input devices, output devices, communication interfaces, and/or other types of devices. A computer system or computing device can also include a combination of hardware and software. It should be appreciated that various types of computer-readable storage media can be part of a computer system or computing device. As used herein, the terms "computer-readable storage media" and "computer-readable storage medium" do not mean and unequivocally exclude a propagated signal, a modulated data signal, a carrier wave, or any other type of transitory computer-readable medium. In various implementations, the control system 40 may include a processor configured to execute computer-executable instructions and a computer-readable storage medium (e.g., memory and/or additional hardware storage) storing computer-executable instructions configured to perform various steps, methods, and/or functionality in accordance with aspects of the described subject matter.

Computer-executable instructions can be embodied and/or implemented in various ways such as by a computer program (e.g., client program and/or server program), a software application (e.g., client application and/or server application), software code, application code, source code, executable tiles, executable components, routines, application programming interfaces (APIs), functions, methods, objects, properties, data structures, data types, and/or the like. Computer-executable instructions can be stored on one or more computer-readable storage media and can be executed by one or more processors, computing devices, and/or computer systems to perform particular tasks or implement particular data types in accordance with aspects of the described subject matter.

The control system 40 can implement and utilize one or more program modules. Generally, program modules include routines, programs, objects, components, data structures, etc., that perform particular tasks or implement particular abstract data types.

The control system 40 can be implemented as a distributed computing system or environment in which components are located on different computing devices that are connected to each other through network (e.g., wired and/or wireless) and/or other forms of direct and/or indirect connections. In such distributed computing systems or environments, tasks can be performed by one or more remote processing devices, or within a cloud of one or more devices, that are linked through one or more communications networks. In a distributed computing environment, program modules can be located in both local and remote computer storage media including media storage devices. Still further, the aforementioned instructions can be implemented, in part or in whole, as hardware logic circuits, which can include a processor.

The control system 40 can be implemented by one or more computing devices such as computers, PCs, server computers configured to provide various types of services and/or data stores in accordance with aspects of the described subject matter. Exemplary sever computers can include, without limitation: web servers, front end servers, application servers, database servers, domain controllers, domain name servers, directory servers, and/or other suitable computers.

Components of the control system 40 can be implemented by software, hardware, firmware or a combination thereof. For example, the control system 40 can include components implemented by computer-executable instructions that are stored on one or more computer-readable storage media and that are executed to perform various steps, methods, and/or functionality in accordance with aspects of the described subject matter.

The control system 40 can include a controller 42, memory, additional hardware storage, input devices, and output devices. Input devices can include one or more of the exemplary input devices described above and/or other type of input mechanism and/or device. Output devices can include one or more of the exemplary output devices described above and/or other type of output mechanism and/or device.

The control system 40 can contain one or more communication interfaces that allow control system 40 to communicate with other computing devices and/or other computer systems. The control system 40 can include and/or run one or more computer programs implemented, for example, by software, firmware, hardware, logic, and/or circuitry of the control system 40. Computer programs can include an operating system implemented, for example, by one or more exemplary operating systems described above and/or other type of operating system suitable for running on computing device. Computer programs can include one or more applications.

Figure 6:
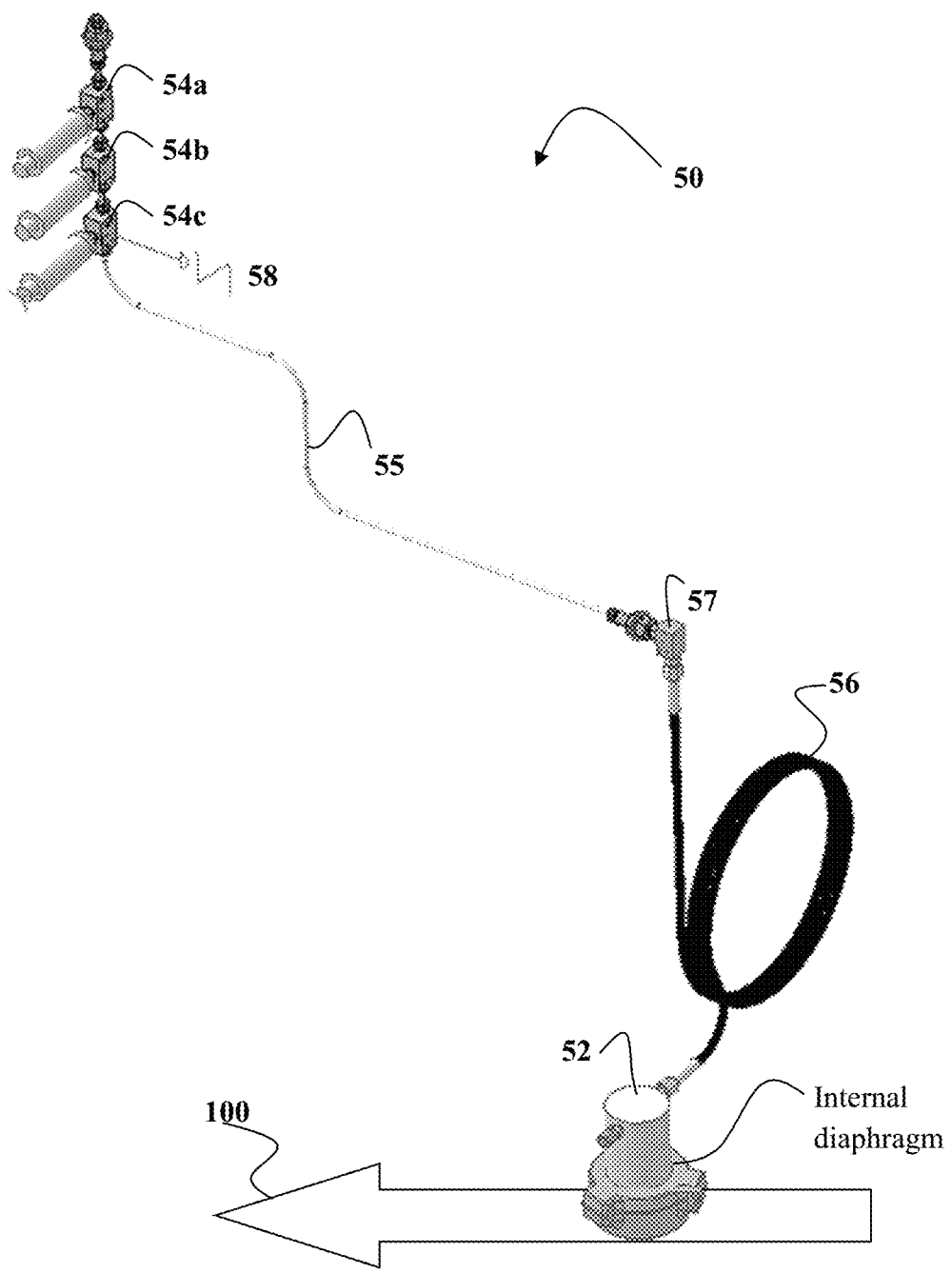
FIG. 6 illustrates a pressure sensor system for use in the relief valve system in accordance with certain aspects of the presently disclosed invention.

With reference to FIG. 6, the pressure sensor 50 may include at least one pressure transducer (54*a-c*) and a pressure sensor 52. The pressure sensor may include a diaphragm configured to sense an external pressure and deform to translate that external pressure to an internal pressure on a pressure fluid within the diaphragm, which is then registered by the at least one pressure transducer (54*a-c*) and converted to an electrical signal (e.g., piezoresistive pressure sensor or silicon cell). The electrical signal 58 may then be communicated via a communication cable to the control system 40 where the signal may be calculated and utilized to control a pump operation of the valve actuation system 30.

The at least one pressure transducer (54*a-c*) may be comprised of any pressure sensor device that is capable of receiving and measuring physical pressure from the pressure fluid within the diaphragm. A pressure passage 56/55 may be fluidly connected between the interior of the diaphragm and the at least one pressure transducer (54*a-c*) to transfer the fluid pressure from the pressure fluid within the diaphragm to the pressure transducer. The diaphragm may be comprised of a flexible and deformable structure so that an external pressure in the diaphragm causes a deformation that may be registered by the pressure fluid. Selection of the materials used for construction of the diaphragm may take into account the expected pressures to which the diaphragm may be exposed. For example, in the hydraulic fracturing industry, the pressures within conduits may be as high as 10,000 to 30,000 psi. As such, the diaphragm may be formed of a metal material capable of withstanding these high pressures yet flexible enough to deform with changes in the pressure.

The pressure sensor 52 may be positioned on a conduit so that the diaphragm comes into direct contact with the fluid in the conduit, and can respond to, or measure, a fluid pressure of the liquid within the conduit (5 or 100; external pressure). This external pressure on the diaphragm is translated via the pressure passages 55/56 to the at least one pressure transducer. One portion of the pressure passage 55 and the at least one pressure transducer (54*a-c*) may be housed in the hydraulics enclosure 3. A second portion of the pressure passage 56 may be connectable via a port 36 on the hydraulics enclosure 3, such as by a connector end 57 on the pressure passage 56.

The diaphragm is sealed with respect to the at least one pressure transducer so that fluids in the conduit to which the sensor 52 is attached do not come into contact with the at least one pressure transducers (54*a-c*). This latter function is enable by the design of the pressure sensor 52. That is, the diaphragm surrounds and retains a pressure fluid within the diaphragm (e.g., in a pressure chamber). The pressure fluid is preferably comprised of a relatively non-compressible and non-expandable fluid such as, but not limited to, oil to efficiently transfer the external fluid pressure applied to the diaphragm to the at least one pressure transducer (54*a-c*). The pressure fluid preferably has no or a limited amount of air or other gases that can be compressed or expand based on temperature.

The pressure sensor 52 may include a pressure chamber which encloses the diaphragm and the pressure fluid. According to certain aspects of the present invention, the pressure chamber is preferably a hollow cylindrical structure, wherein the diaphragm is compressible based on the external fluid pressure. The diaphragm may have a substantially circular, square, or rectangular cross sectional area, and/or may be formed as a disk, a bellows, a cylindrical structure, or any other structure that may deform in a manner indicative of a fluid pressure in a conduit to which the diaphragm is attached. While specific embodiments of the pressure sensing system 50 have been disclosed herein, others are possible and within the scope of the present invention.

The valve assembly may include any type of actuator 32 configured to operate the valve 22 from the closed position to an open position, and then back to the closed position during each of a plurality of operation cycles. In some cases, valve actuator 32 may be a solenoid actuator, a hydraulic actuator, a magnetic actuator, an electric motor, pneumatic actuator, and/or other similar or different types of actuators, as desired. According to certain embodiments, the valve actuator 32 may be a pneumatic or hydraulic actuator driven by an actuator fluid 34. In preferred embodiments, the actuator 32 may be a hydraulic actuator driven by hydraulic fluid 34. Such an embodiment may provide improved safety on extreme worksites, such as those of a standard hydraulic fracturing or wellbore completion operation (e.g., exposure to extremes temperatures and weather).

Figure 7:
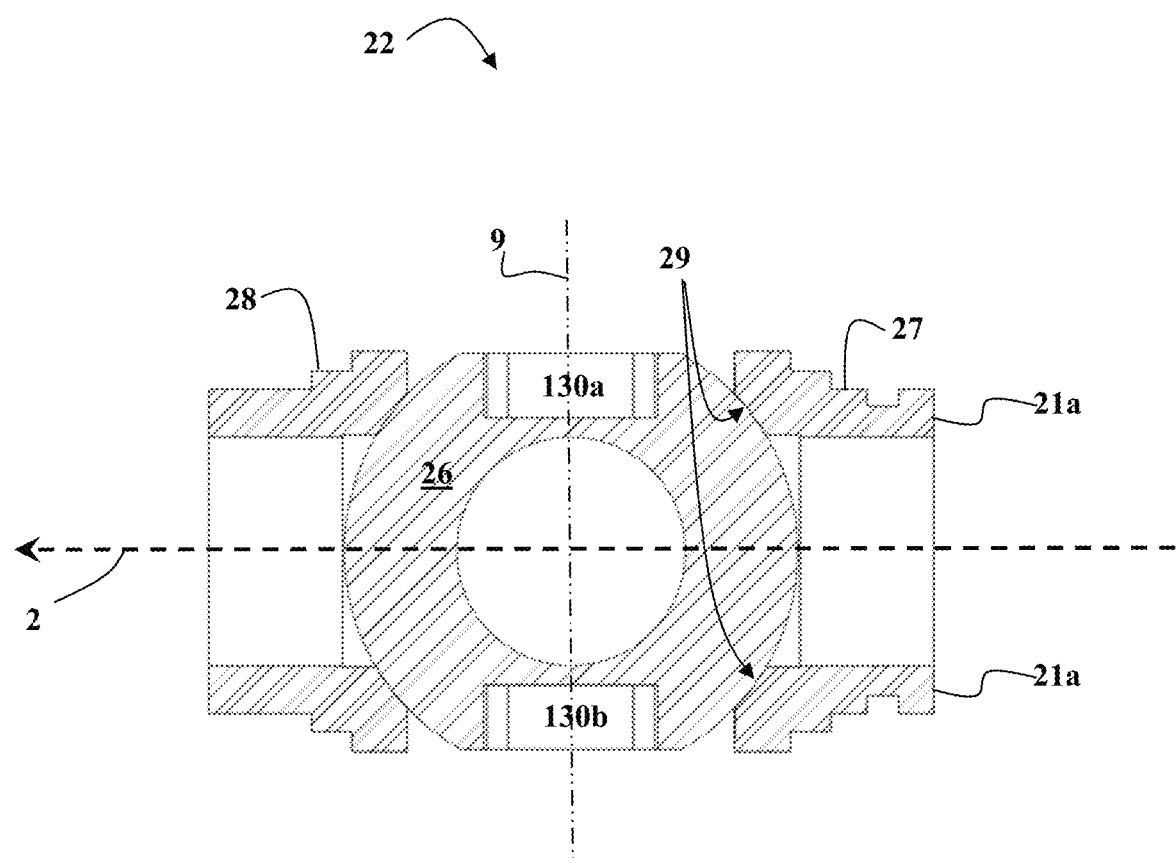
FIG. 7 illustrates a ball valve for use in the relief valve system in accordance with certain aspects of the presently disclosed invention.
Figure 8:
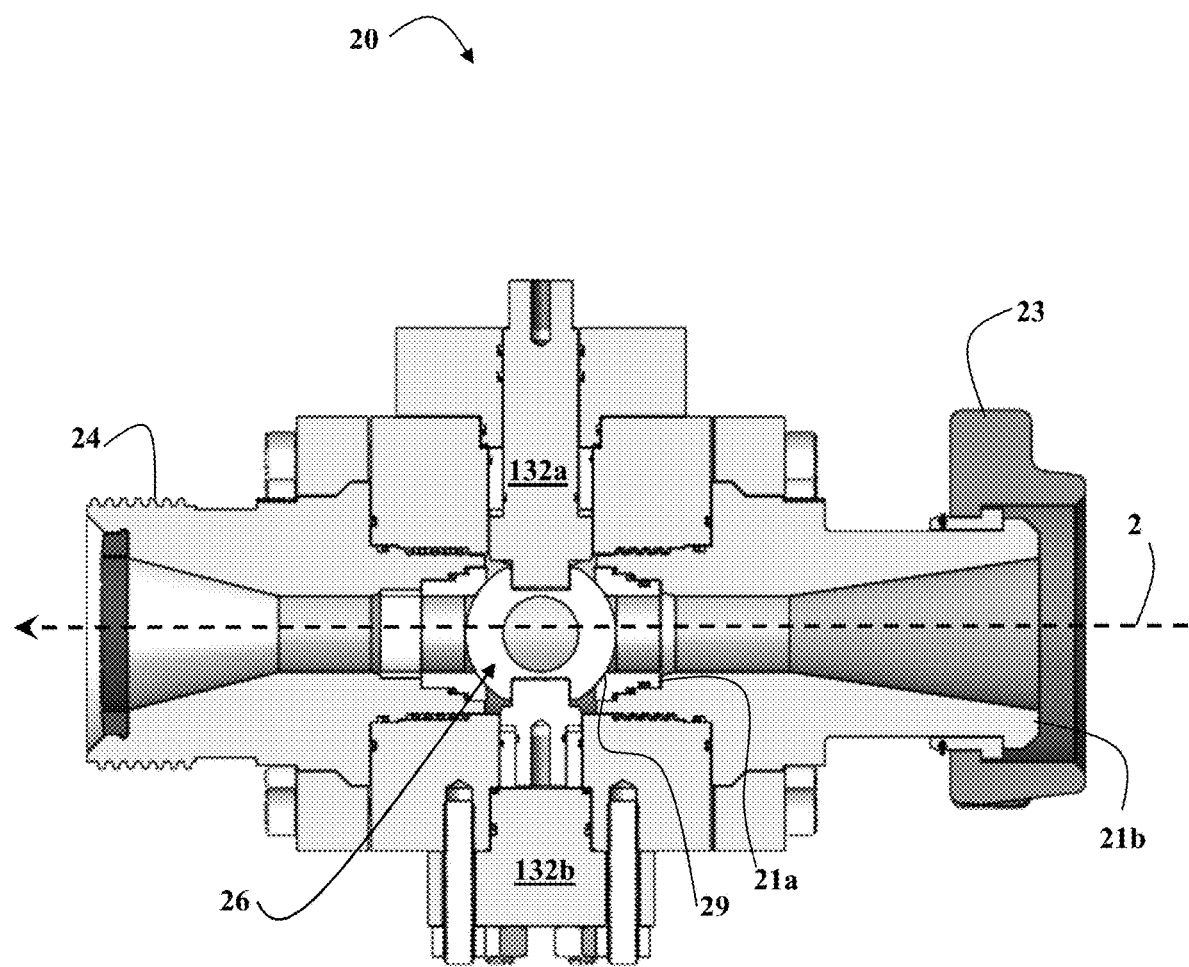
FIG. 8 illustrates a valve housing which includes the ball valve of FIG. 7 in accordance with certain aspects of the presently disclosed invention.

With reference to FIGS. 7 and 8, a valve housing 20 and a valve 22 in accordance with certain aspects of the present invention is shown. The valve housing 20 generally includes a longitudinal bore therethrough (arrow 2), and includes an upstream connection 23 and a downstream connection 24. Contained within the valve housing is a valve body 26. The valve may be a ball valve, thus the valve body 26 may have a throughbore, wherein an open position of the valve body 26 provides flow-through alignment (see arrow 2) of the throughbore with upstream and downstream connections of the valve housing, and a closed position of the valve body provides an out of flow-through alignment of the throughbore with the upstream and downstream connections of the valve housing. The valve body 26 may be selectively rotatable about an axis (line 9) within the valve housing 20 to the open and closed positions.

The valve body 26 may further have an upstream seal 27 and a downstream seal 28, each also having a longitudinal bore therethrough (arrow 2; note, the valve body 26 is shown in the closed position in FIGS. 7 and 8 with the through bore out of alignment with the longitudinal bore of the valve housing and the upstream and downstream seals). Also shown are the actuating arm 132*a* and connection port 130*a* for the arm on the valve body 26 (132*b* is a termination assembly attachable in a bottom connection port 130*b* on the valve body 26).

The upstream seal 27 of the valve body 26 may include an outward facing surface 21*a* positioned perpendicular to the longitudinal bore of the valve housing, such that a fluid pressure on the outward facing surface 21*a* may force the upstream seal against a sealing face 29 of the valve body 26. Additionally, the upstream connection 23 of the valve housing may include an outward facing surface 21*b* that may be exposed to a fluid flow, such that fluid pressure on the outward facing surface 21b may force the upstream connection 23 against the upstream seal 27, in turn forcing the upstream seal 27 against the sealing face 29 of the valve body 26. This acts to provide a dynamic seal for the valve body 26 within the valve housing 20, wherein increased fluid pressure within the conduit leads to dynamic increases in the sealing pressure applied on the sealing face 29. Moreover, the unique arrangement of seals on the valve body, and positioning of the valve body within the valve housing, isolates the sealing face from the abrasive fluid flow in the conduits. When closed, no portion of the seal in the ball valve is exposed to the fluid flow, and when open, the sealing face on the valve body is turned away from the fluid flow (out of alignment).

The valve body 26 may be connected to the valve actuator 32 via an actuating arm 132. According to certain aspects of the present invention, the valve actuator 32 may be a scotch yoke actuator. As the actuator moves in a housing, the actuating arm 132 connected between the valve body 26 and the actuator 32 causes the valve body 26 to rotate within the valve housing. For example, the valve body 26 may rotate a quarter turn. The actuating arm 132 may be configured as a scotch yoke, which is a mechanism for converting the linear motion of a slider into rotational motion. For example, the actuating arm 132 may include a disk having a pin that interacts with a sliding yoke at one end of a piston of the actuator 32. Movement of the piston within an actuator chamber may provide linear movement of the yoke that is translated to a rotational movement of the arm 132.

The system may further include one or more batteries to power the control system 40 and the valve actuation assembly 30. These batteries may be rechargeable battery cells. Further, the batteries may include a charge sensor configured to sense a charge state of the at least one battery cell, and a circuit electrically connected to the charge sensor for receiving a signal indicative of the charge state of the at least one battery cell. Additional sensors may be included which register a temperature, voltage, current, etc. of the at least one battery, and such information (data) may also be relayed via a circuit to the control system 40, and may be shown visually on the voltmeter 66 and/or charging indicator lamp 67. The battery may also indicate the charge status by an audible signal that may change (e.g., start at a certain charge state, grow louder and/or increase frequency of signal, etc.) as the battery is progressively discharged.

When more than one battery cell is included, each individual battery may include a charge sensor (and optionally additional sensors), which may communication via individual circuits, or may communicate directly, to a battery management system. Such a system manages a rechargeable battery (cell or group of cells), such as by protecting the battery from operating outside its safe operating area, temperature, voltage, etc. and by monitoring its state, calculating secondary data, reporting that data, controlling its environment, authenticating it and/or balancing the usage of individual cells in a groups of cells.

The at least one battery may further include a connection means for an external power source which may provide for recharging of the at least one battery cell. For example, the external power source may be provided by AC power from a wall outlet, such as a GFCI outlet, and the connection means may include a standard power cord. Alternatively, the external power source may be provided by a battery docking station which acquires power from a standard wall outlet. The battery docking station may provide power to the battery via direct contact between one or more electrical charging contacts. The battery docking station may provide power to the battery wirelessly. Moreover, more than one means for recharging may be included on the battery.

As detailed above, according to certain aspects of the present invention, the system may be include two valve assemblies, such as two ball valves actuated by two scotch yoke actuators, wherein each valve assembly includes a valve position sensor and an indicator light assembly, and a control system. These components may be included in a frame which may be transportable, such as a road transportable frame. According to certain aspects of the invention, the system may further include at least one fluid catch tank to receive the fluid released when the relief valve system is opened, and at least one tank level probe to monitor a liquid level in the fluid catch tank. The system may also include tank mounted fluid diffusers that control input of fluid from either or both of the valve outlets (e.g., at the valve outlet, or at an end of a bypass line attached to the valve outlet—5b) to the fluid catch tank.

The frame of the system may include a mount for the control system, and may optionally include vibration isolation on the mount to lessen the impact of vibrations from the valve assembly on the control system 40. The control system 40 may provide electronic control of the hydraulic actuator (hydraulic control circuit), and receive feedback from each of the pressure sensors. In certain embodiments, up to four pressure sensing assemblies may be included, wherein each pressure sensor includes at least two pressure transducers, such as three pressure transducers. Thus, the control system may be configured to receive data from more than one pressure sensor (i.e., pressure transducer).

The control system may be a remote electronic user interface that may provide control of the valves, such as by setting high and low pressure set-points. Moreover, the user interface may also provide instant interaction with the valves, such as opening and closing of the valves. The control system may store data related to the sensed pressures, valve opening and closings, etc., which may be output visually on a display panel of the control system or electronically (via direct wired or wireless connection) to another user device (remote).

The system may be powered via a direct AC or DC connection, such as via a rechargeable battery. The batteries may be used to power the control system, the sensors, and the hydraulic actuator. In certain instances, the batteries may also be used to power other optional components, such as fluid circulation pump circuits, throttles for the actuators, piping system heaters, and electrical lighting. Moreover, the control system may be electronically linked to each of these additional optional components to provide control for each.

The various components discussed hereinabove may be combined to create an architecture for the system that has complete independent control of both valves and their respective positions and may interpret two independent pressurized fluid conduits. The system may be incorporated into various high pressure conduits, such as those used in hydraulic fracturing or wellbore completions operations. For example, when included in such an operation to provide pressure relief for a single conduit, a first end of a first bypass conduit may be attached to the upstream connection 23 of the valve housing 20 of a first valve assembly, and a second end of the first bypass conduit to the high pressure conduit, and a first end of a second bypass conduit may be attached to the downstream connection 24 of the valve housing 20 of the first valve assembly. At least one pressure chamber 52 may be attached on the high pressure conduit, such that an outward facing side of the diaphragm is in contact with a fluid in the high pressure conduit. High and low pressure limits may then be set on the control system 40. These may be set by the user, or may be preset based on a standard type of service on a standard type of high pressure conduit. Moreover, a user may start with present values and make changes thereto based on adaptations to the high pressure conduits, current environmental conditions, etc.

The high and low pressure limits may be those known in the industry of use. For example, in the hydraulic fracturing industry, the high pressure conduits can be rated to withstand fluid pressures of up to 10,000 psi, or up to 20,000 psi, or even up to as much as 30,000 psi. The high pressure limits may therefore be set based on the rating of the high pressure conduit for which the system may provide pressure relief, and may be set at the rated pressure limit, or below the rated pressure limit. Such settings are known to those of skill in the art. The low pressure limits may be adjusted to be at least 10% below the high pressure limit, such as at least 1,000 psi below the high pressure limit, or at least 2,000 psi below the high pressure limit, or at least 5,000 psi below the high pressure limit, or even 10,000 psi below the high pressure limit.

The control system will then receive signals from the at least one pressure sensor indicating a fluid pressure in the high pressure conduit, and communicate with the valve actuation system of the first valve assembly to change a position of the valve, such that when the fluid pressure in the fluid line exceeds the high pressure limit the valve is opened, and when the fluid pressure in the fluid line falls below the low pressure limit the valve is closed. According to certain aspects of the present invention, control logic is implemented by the control system that causes the valve to remain open until a downward trend is registered in the pressure reading(s) after the low pressure limit has been reached. For example, according to certain aspects of the present invention, at least the next pressure reading after the low pressure limit has been reached must also be below the low pressure limit, such as by an amount at least 10% below, or 30% below, or even 50% below the previous pressure reading, after which the valve may reclose. According to certain aspects of the present invention, the downward may include at least the next pressure reading after the low pressure limit has been reached, or the next two or more pressure reading after the low pressure limit has been reached.

Additional valve assemblies may be attached to provide overpressure relief for the same high pressure conduit. That is, a first end of a third bypass conduit may be attached to the upstream connection of the valve housing of a second valve assembly, and a first end of a forth bypass conduit may be attached to the downstream connection of the valve housing of the second valve assembly. The high pressure limit and low pressure limit for this second valve assembly may be set using the user interface on the control system, wherein the control system is configured to communicate with the valve actuation system of the second valve assembly to change a position of the valve. In this scenario, the first, second, third, and forth bypass conduits are all portions of a single bypass line having a connection to the same high pressure conduit.

Alternatively, the additional valve assemblies may be attached to provide overpressure relief for the different high pressure conduit. In this scenario, the first and second bypass conduits would be portions of a first bypass line having a connection to a first high pressure conduit, and the third and fourth bypass conduits would portions of a second bypass line having a connection to a second high pressure conduit.

In any of the methods discussed herein, additional pressure sensors may be used. As such, additional pressure chambers of a second, or third, or greater pressure sensor may be attached on the first or second fluid line such that an outward facing side of the diaphragm is in contact with a fluid in the second fluid line. In this scenario, the control system may receive signals from each of the additional pressure sensors indicating a fluid pressure in the high pressure conduit to which it is attached. The control system may then use this data to control positions of the various valves in the system.

Figure 9:
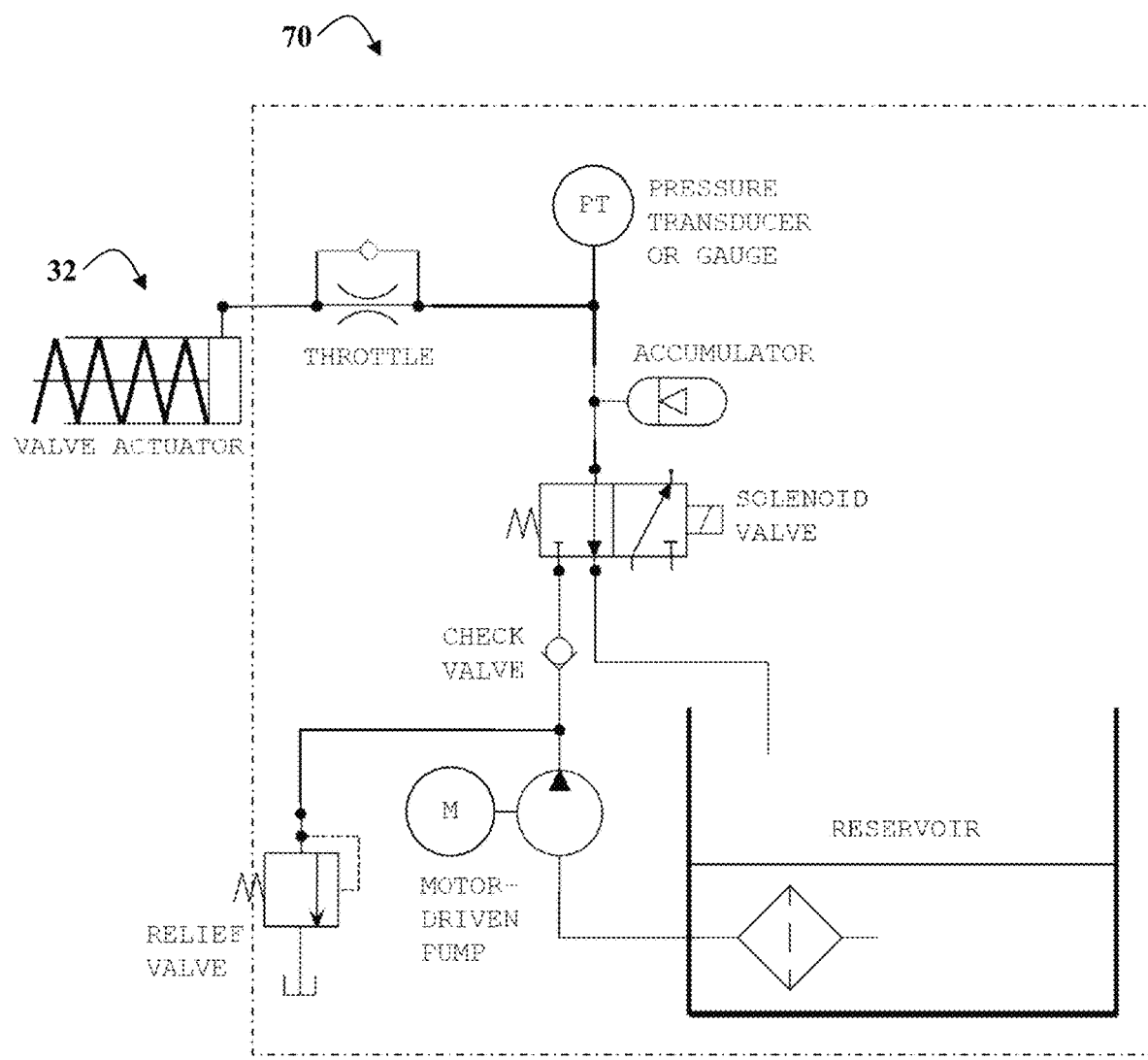
FIG. 9 is a schematic showing hydraulic control of the relief valve system in accordance with certain aspects of the presently disclosed invention.

Hydraulic control of the relief valve actuation according to certain aspects of the present invention is shown in FIG. 9. The valve actuator 32 may be controlled by various components of a hydraulic control system 70, which include one or more valves to control and direct communication between a motor driven pump 33, a hydraulic fluid reservoir 34, and the relief valve 22. The one or more valves may include a solenoid valve, a check valve, and/or any other type of valve operable to open and close, or direct, the fluid circuits between the pump 33, the hydraulic fluid reservoir 34, and the relief valve 22. The hydraulic control system 70 may include one or more gauges, such as a pressure transducer of gauge which can be visually inspected to monitor the pressure in the flow lines (note: this is a pressure transducer that registers pressure in the valve actuation chamber, and is not the same pressure transducer shown in FIG. 6 and labelled as 50/52 in FIGS. 1, 6, and 11-13). According to certain aspects of the present invention, the pressure gauge may be configured to shut off the motor driven pump 33 when the pressure in the actuator 32 of the relief valve 22 reaches a pre-determined pressure setting. The one or more valves may also be controlled by the control system 40 as detailed above.

Figure 10:
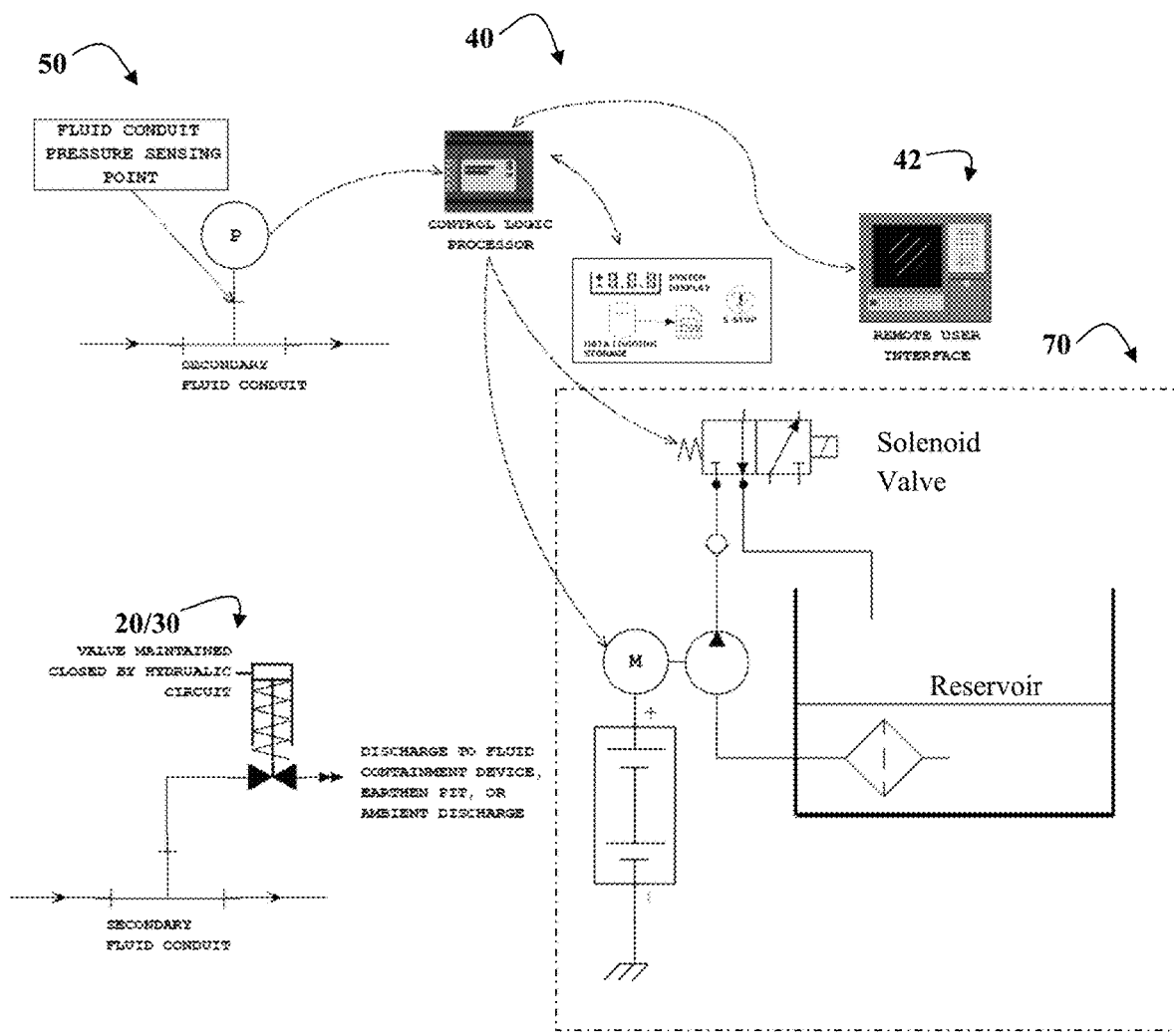
FIG. 10 is a schematic showing the relationship of major subassemblies of a relief valve system in accordance with certain aspects of the presently disclosed invention.

The relationship between major subassemblies of the present system according to certain aspects of the present invention is shown in FIG. 10. A fluid sensing point (50) which may include a pressure sensor comprising a diaphragm as detailed above, may be positioned on a secondary or bypass fluid line, wherein the bypass fluid line is attached at an upstream point to the main high pressure conduit. Also shown are the control system 40 and the remote user interface 42. The relief valve assembly (20/30) may also be positioned on the same or a different secondary or bypass fluid line. Another embodiment of the hydraulic control system 70 as detailed in FIG. 9 is shown, wherein a motor driven pump 33, hydraulic fluid reservoir 34, and solenoid valve are included. The solenoid valve assembly may be in communication with the control system 48 to control operation (e.g. open and close) of the valve assembly (20/30) to thereby control actuation of the valves 22 as desired.

Figure 11:
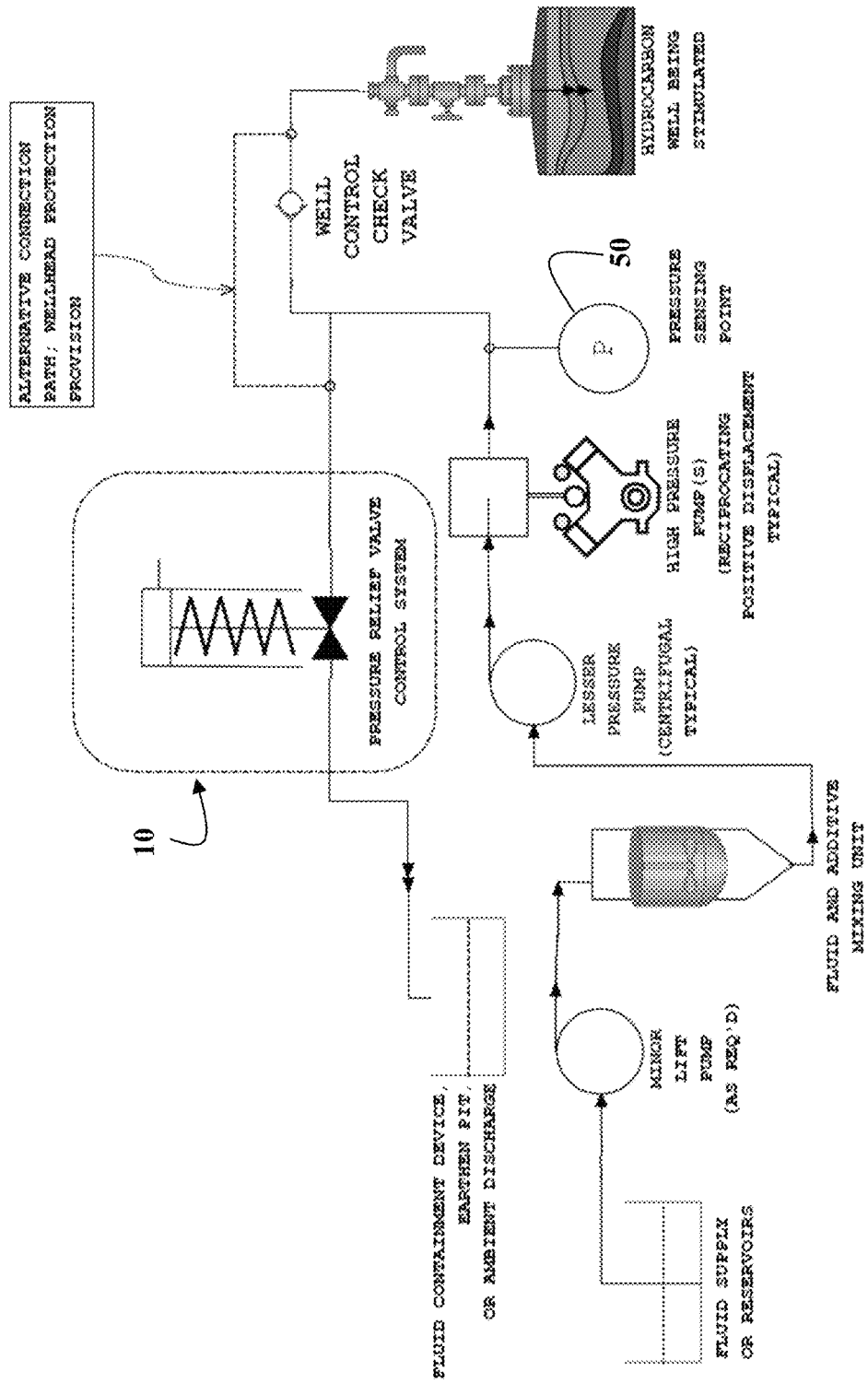
FIG. 11 is a schematic showing a relief valve system positioned to protect a hydraulic fracking wellhead in accordance with certain aspects of the presently disclosed invention.
Figure 12:
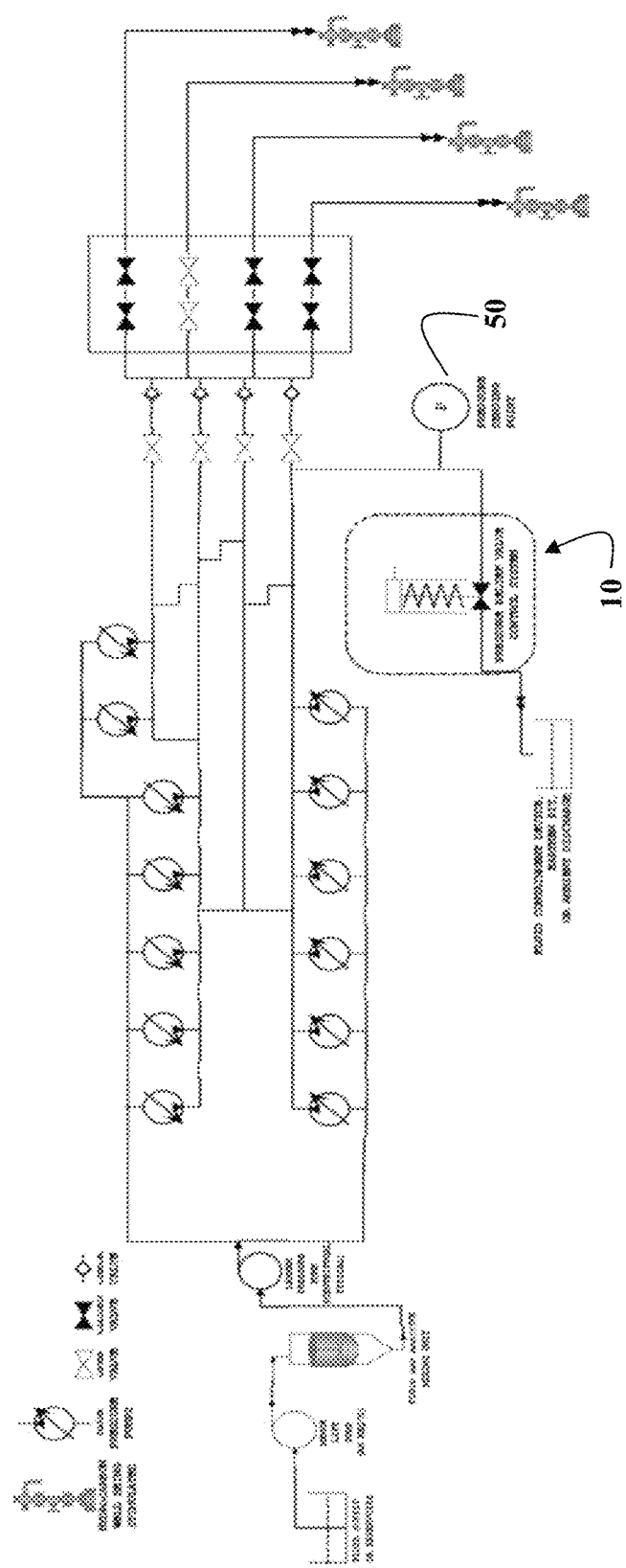
FIG. 12 is a schematic showing a relief valve system positioned to protect multiple hydraulic racking wellheads in accordance with certain aspects of the presently disclosed invention.
Figure 13:
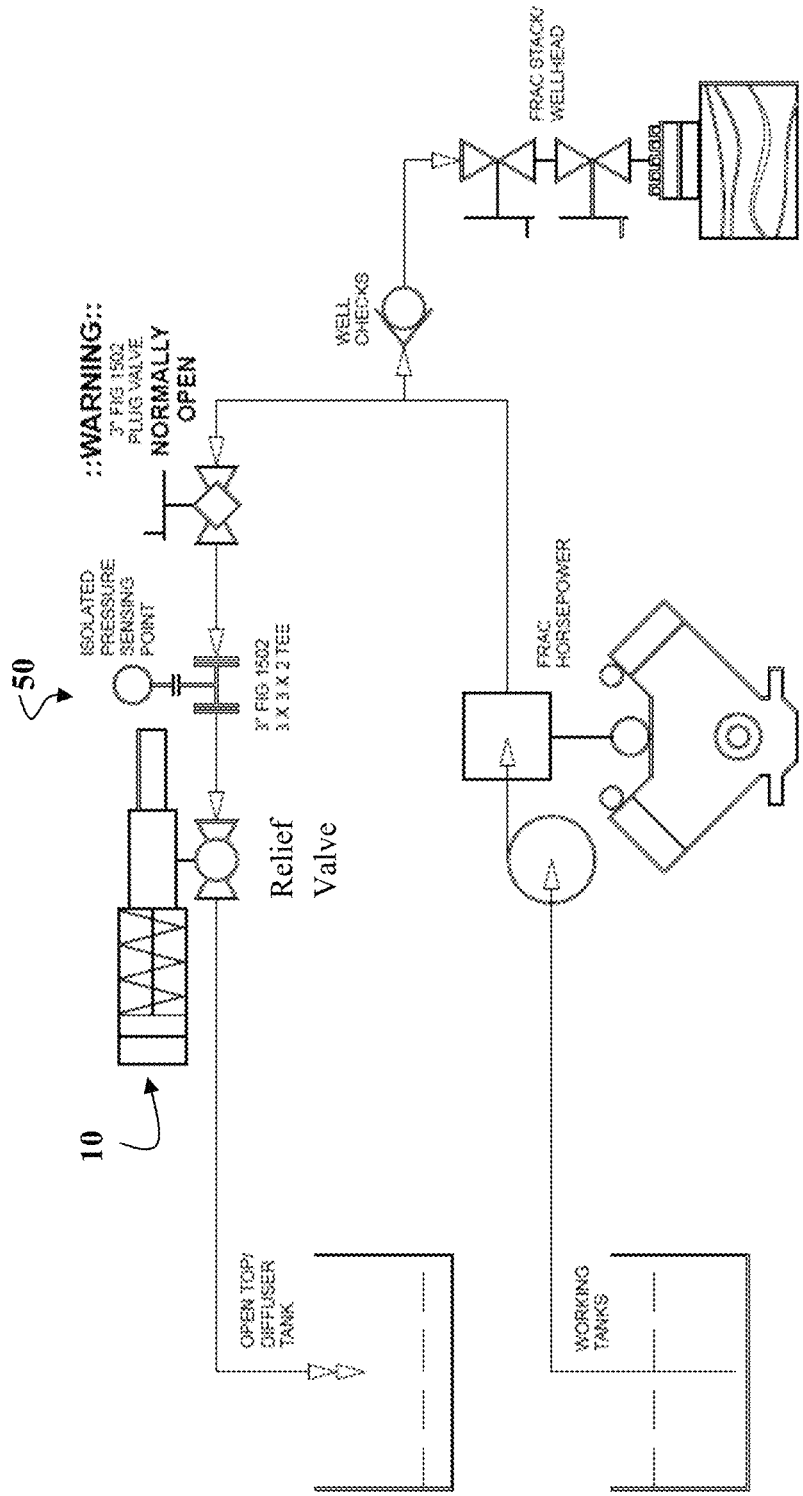
FIG. 13 is a schematic showing a relief valve system positioned to protect a hydraulic hacking wellhead in accordance with certain aspects of the presently disclosed invention.

Various exemplary placements of the systems 10 of the present invention are shown within standard hydraulic fracturing or wellbore completions operations in FIGS. 11-13.

While specific embodiments of the invention have been described in detail, it should be appreciated by those skilled in the art that various modifications and alternations and applications could be developed in light of the overall teachings of the disclosure. Accordingly, the particular arrangements, systems, apparatuses, and methods disclosed are meant to be illustrative only and not limiting as to the scope of the invention. For example, while the systems and methods of the present invention have been described as useful for monitoring overpressure events of high pressure conduits, such as those used in the hydraulic fracturing industry and in wellbore completion activities, they may easily find use in other types of conduits and in other industries as would be understood by someone of ordinary skill in the art.

What is claimed is:

1. A system for overpressure control, the system comprising:
at least two valve assemblies, each comprising:
a valve actuation system including a source of actuation fluid, and
a valve housing having a longitudinal bore therethrough, and including an upstream connection, a downstream connection, and a valve positioned therebetween,
wherein the valve housing is positionable inline on a bypass conduit via the upstream and downstream connections, and downstream from a connection point with a main conduit;
a pressure sensor configured to detect a fluid pressure in the main conduit, the pressure sensor comprising:
two or more pressure transducers, and
a pressure chamber having a diaphragm surrounding a pressure fluid within the pressure chamber,
wherein the pressure fluid is fluidly connected to the at least one pressure transducer to transfer an external fluid pressure on the diaphragm to the pressure transducer, and wherein the diaphragm comprises a flexible and deformable structure; and
a control system in electronic communication with the pressure sensor and the valve actuation system,
wherein the control system is configured to receive a signal from the pressure sensor indicating the fluid pressure in the main conduit, and communicate with the valve actuation system to change a position of the valve within the valve housing, such that when the fluid pressure in the main conduit exceeds a user-defined high pressure limit the valve is opened, and when the fluid pressure in the main conduit falls below a user-defined low pressure limit the valve is closed.

2. The system of claim 1, further comprising:
a frame configured to contain the at least two valve assemblies, the at least one pressure transducer, and the controller.

3. The system of claim 1, wherein the signal from the pressure sensor received by the control system comprises individual signals from the two or more pressure transducers, and wherein the individual signals are received at a rate of at least 50 signals/second.

4. The system of claim 1, wherein the pressure chamber is attachable on the main conduit such that the fluid pressure in the main conduit comprises the external fluid pressure on the diaphragm.

5. The system of claim 1, wherein the actuation fluid comprises a hydraulic fluid.

6. The system of claim 1, wherein the valve actuation system comprises a scotch yoke and is configured to open the valve at a rate sufficient to reduce the fluid pressure in the main conduit by at least 50% within 1 second.

7. The system of claim 1, wherein the valve actuation system comprises a biasing member in a valve actuation chamber which biases the valve to an open position, and wherein supply of the valve actuation fluid into the valve actuation chamber provides counterforce on the biasing member to move the valve to a closed position.

8. The system of claim 1, wherein the valve comprises a ball valve comprising:
a valve body having a throughbore, wherein an open position of the valve body provides flow-through alignment of the throughbore with the upstream and downstream connections of the valve housing, and a closed position of the valve body provides an out of flow-through alignment of the throughbore with the upstream and downstream connections of the valve housing,
an upstream seal comprising an outward facing surface positioned perpendicular to the longitudinal bore of the valve housing, wherein a fluid pressure on the outward facing surface forces the upstream seal against a sealing face of the valve body, and
a downstream seal.

9. A system for overpressure control, the system comprising:
at least two valve assemblies positionable on a bypass conduit downstream from a connection point with a main conduit, each of the two valve assemblies comprising:
a valve actuation system including a source of actuation fluid,
a valve housing having a longitudinal bore therethrough, and including an upstream connection and a downstream connection, and
a ball valve positioned in the valve housing between the upstream connection and the downstream connection, the ball valve comprising:
a valve body having a throughbore, wherein an open position of the valve body provides flow-through alignment of the throughbore with the upstream and downstream connections of the valve housing, and a closed position of the valve body provides an out of flow-through alignment of the throughbore with the upstream and downstream connections of the valve housing,
an upstream seal comprising an outward facing surface positioned perpendicular to the longitudinal bore of the valve housing, wherein a fluid pressure on the outward facing surface forces the upstream seal against a sealing face of the valve body, and
a downstream seal;
a pressure sensor configured to detect a fluid pressure in the main conduit wherein the pressure sensor comprises:
at least two pressure transducers positioned in a main housing of the system, and
a pressure chamber having a deformable diaphragm surrounding a pressure fluid within the pressure chamber,
wherein the pressure fluid is fluidly connected to the at least two pressure transducers to transfer an external fluid pressure on the deformable diaphragm to the at least two pressure transducers, and
wherein the pressure chamber is configured to be positioned on the main conduit line such that the fluid pressure in the main conduit line comprises the external fluid pressure on the diaphragm; and
a control system in electronic communication with the pressure sensor and the valve actuation system,
wherein the control system is configured to receive a signal from the pressure sensor indicating the fluid pressure in the main conduit, and communicate with the valve actuation system to change a position of the valve within the valve housing, such that when the fluid pressure in the main conduit exceeds a user-defined high pressure limit the valve is opened, and when the fluid pressure in the main conduit falls below a user-defined low pressure limit the valve is closed.

10. The system of claim 9, wherein the sealing face of the valve body is a polished metal.

11. The system of claim 9, wherein the actuation fluid comprises a hydraulic fluid.

12. The system of claim 9, wherein the valve actuation system comprises a scotch yoke.

13. The system of claim 9, wherein the valve actuation system is configured to open the valve at a rate sufficient to reduce the fluid pressure in the main conduit by at least 50% within 1 second.

14. The system of claim 13, wherein the control system is configured to hold the valve open for a set time period when the fluid pressure in the main conduit exceeds the user-defined high pressure limit, and if, after the set time period, the fluid pressure in the main conduit is at or below the user-defined low pressure limit, the controller is configured to close the valve.

15. A method for overpressure control in a fluid line, the method comprising:
providing an overpressure relief system comprising:
at least two valve assemblies, each comprising:
a valve actuation system including a source of actuation fluid, and
a valve housing having a longitudinal bore therethrough, the valve housing comprising an upstream connection, a downstream connection, and a valve positioned therebetween;
at least one pressure sensor comprising:
at least two pressure transducers, and
a pressure chamber having a diaphragm surrounding a pressure fluid within the pressure chamber, wherein the pressure fluid is fluidly connected to the at least two pressure transducers to transfer an external fluid pressure on the diaphragm to the pressure transducer, and wherein the diaphragm comprises a flexible and deformable structure; and
a control system in communication with the pressure sensor and the source of actuation fluid;
attaching a first end of a first bypass conduit to the upstream connection of the valve housing of a first valve assembly, and a second end of the first bypass conduit to the fluid line;
attaching a first end of a second bypass conduit to the downstream connection of the valve housing of the first valve assembly;
attaching the pressure chamber of a first pressure sensor on the fluid line such that an outward facing side of the diaphragm is in contact with a fluid in the fluid line; and
setting a high pressure limit and a low pressure limit for the first valve assembly using a user interface on the control system,
wherein the control system is configured to receive a signal from the at least one pressure sensor indicating a fluid pressure in the fluid line, and communicate with the valve actuation system of the first valve assembly to change a position of the valve, such that when the fluid pressure in the fluid line exceeds the high pressure limit the valve is opened, and when the fluid pressure in the fluid line falls below the low pressure limit the valve is closed.

16. The method of claim 15, further comprising:
attaching a first end of a third bypass conduit to the upstream connection of the valve housing of a second valve assembly;
attaching a first end of a forth bypass conduit to the downstream connection of the valve housing of the second valve assembly; and
setting a high pressure limit and a low pressure limit for the second valve assembly using the user interface on the control system,
wherein the control system is configured to communicate with the valve actuation system of the second valve assembly to change a position of the valve.

17. The method of claim 16, wherein the first, second, third, and forth bypass conduits are all portions of a single bypass line having a connection to the fluid line.

18. The method of claim 16, wherein the first and second bypass conduits are portions of a first bypass line having a connection to the fluid line, and the third and forth bypass conduits are portions of a second bypass line having a connection to a second fluid line, wherein the method further comprises:
attaching the pressure chamber of a second pressure sensor on the second fluid line such that an outward facing side of the diaphragm is in contact with a fluid in the second fluid line,
wherein the control system is configured to receive a signal from the second pressure sensor indicating a fluid pressure in the second fluid line, and communicate with the valve actuation system of the second valve assembly to change a position of the valve, such that when the fluid pressure in the fluid line exceeds the high pressure limit the valve is opened, and when the fluid pressure in the fluid line falls below the low pressure limit the valve is closed.

* * * * *